US012803768B2

(12) United States Patent
Gatta et al.

(10) Patent No.: US 12,803,768 B2
(45) Date of Patent: Nov. 17, 2026

(54) MULTIPLE ANTENNA FEED FOR TIME DIVISION DUPLEXING FILTER BYPASSING IN RECEIVE CARRIER AGGREGATION

(71) Applicant: QUALCOMM Incorporated, San Diego, CA (US)

(72) Inventors: Francesco Gatta, San Diego, CA (US); Ryan Scott Castro Spring, San Diego, CA (US); Harish Venkatachari, San Jose, CA (US); Christian Holenstein, La Mesa, CA (US); Mehmet Uzunkol, San Diego, CA (US); Noshir Behli Dubash, Phoenix, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 18/439,409

(22) Filed: Feb. 12, 2024

(65) Prior Publication Data

US 2025/0023703 A1 Jan. 16, 2025

Related U.S. Application Data

(60) Provisional application No. 63/513,242, filed on Jul. 12, 2023.

(51) Int. Cl.
*H04L 5/14* (2006.01)
*H01Q 23/00* (2006.01)

(52) U.S. Cl.
CPC ............... *H04L 5/14* (2013.01); *H01Q 23/00* (2013.01)

(58) Field of Classification Search
CPC .................................. H04L 5/14; H01Q 23/00
See application file for complete search history.

(56) References Cited

U.S. PATENT DOCUMENTS

| | | | | |
|---|---|---|---|---|
| 2015/0257022 | A1 | 9/2015 | Kohlmann et al. | |
| 2018/0302127 | A1* | 10/2018 | Kahrizi | H04B 7/0413 |
| 2020/0366325 | A1* | 11/2020 | Medra | H04B 1/16 |
| 2023/0103039 | A1* | 3/2023 | Guo | H04B 1/40 455/78 |
| 2023/0269060 | A1* | 8/2023 | Leung | H04L 5/001 370/280 |
| 2024/0097756 | A1* | 3/2024 | Pehlke | H04B 1/1615 |

FOREIGN PATENT DOCUMENTS

EP 3155868 B1 8/2022

OTHER PUBLICATIONS

International Search Report and Written Opinion—PCT/US2024/032548—ISA/EPO—Sep. 10, 2024.

* cited by examiner

*Primary Examiner* — Kent Krueger
(74) *Attorney, Agent, or Firm* — Loza & Loza LLP

(57) ABSTRACT

An apparatus, including: a first antenna port; a first set of one or more band filters coupled to the first antenna port; a first set of one or more low noise amplifiers (LNAs) coupled to the first set of one or more band filters, respectively; a second antenna port; a second band filter; a second low noise amplifier (LNA); a first switching device coupled between the second antenna port and the second LNA; and a second switching device coupled between the second antenna port and the second band filter.

20 Claims, 8 Drawing Sheets

MULTIPLE ANTENNA FEED FOR TIME DIVISION DUPLEXING FILTER BYPASSING IN RECEIVE CARRIER AGGREGATION

CROSS-REFERENCE TO RELATED APPLICATION

This application claims the benefit of the filing date of U.S. Provisional Application Ser. No. 63/513,242, filed on Jul. 12, 2023, which is incorporated herein by reference.

FIELD

Aspects of the present disclosure relate generally to radio frequency (RF) front ends, and in particular, to an RF front end including multiple antenna feeds for time division duplexing (TDD) filter bypassing in receive carrier aggregation configuration.

BACKGROUND

A base station may communicate with a user equipment (UE) using a set of simultaneous data-modulated radio frequency (RF) carriers, often referred to as carrier aggregation (CA). More specifically, in wireless communication, carrier aggregation is a technique used to increase data throughput and/or link redundancy per UE, whereby multiple frequency blocks (sometimes referred to as component carriers) are assigned and used to simultaneously or concurrently communicate data with a particular UE. The UE may employ an RF front end to receive and process the set of data modulated RF carriers. It may be desirable to design such RF front end to increase its sensitivity with regard to one or more of the data modulated RF carriers to improve signal-to-noise ratio (SNR), signal gain, and noise figure (NF).

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus includes: a first antenna port; a first set of one or more band filters coupled to the first antenna port; a first set of one or more low noise amplifiers (LNAs) coupled to the first set of one or more band filters, respectively; a second antenna port; a second band filter; a second low noise amplifier (LNA); a first switching device coupled between the second antenna port and the second LNA; and a second switching device coupled between the second antenna port and the second band filter.

Another aspect of the disclosure relates to a method. The method includes receiving a first set of one or more radio frequency (RF) signals via a first antenna port in accordance with a first or second carrier aggregation mode; filtering the first set of one or more RF signals in accordance with the first or second carrier aggregation mode; amplifying the first set of one or more filtered RF signals in accordance with the first or second carrier aggregation mode; receiving a second RF signal via a second antenna port in accordance with the first carrier aggregation mode; bypassing a filtering of the second RF signal in accordance with the first carrier aggregation mode; and amplifying the filter-bypassed second RF signal in accordance with the first carrier aggregation mode.

Another aspect of the disclosure relates to an apparatus. The apparatus includes means for receiving a first set of one or more radio frequency (RF) signals via a first antenna port in accordance with a first or second carrier aggregation mode; means for filtering the first set of one or more RF signals in accordance with the first or second carrier aggregation mode; means for amplifying the first set of one or more filtered RF signals in accordance with the first or second carrier aggregation mode; means for receiving a second RF signal via a second antenna port in accordance with the first carrier aggregation mode; means for bypassing a filtering of the second RF signal in accordance with the first carrier aggregation mode; and means for amplifying the filter-bypassed second RF signal in accordance with the first carrier aggregation mode.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
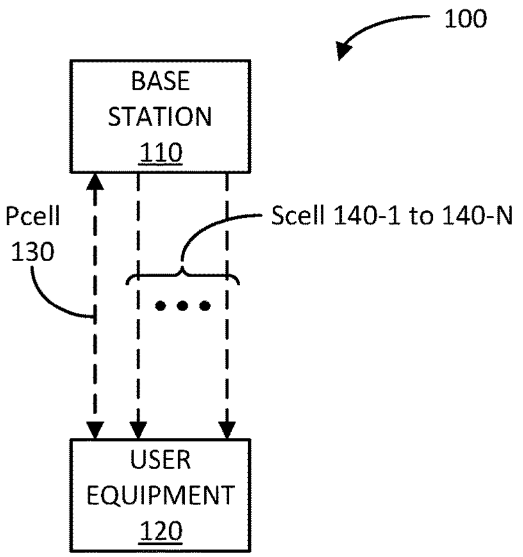
FIG. 1 illustrates a block diagram of an example wireless communication system in accordance with an aspect of the disclosure.

FIG. 1 illustrates a block diagram of an example wireless communication system 100 in accordance with an aspect of the disclosure. The wireless communication system 100 includes a base station (BS) 110 and a user equipment (UE) 120 (e.g., a mobile phone, wireless device, personal computer, laptop, tablet device, network device, Internet of Things (IoT), etc.). Although a single base station 110 and a single user equipment 120 are shown for case of description, it shall be understood that the wireless communication system 100 may (and typically does) include a plurality of base stations and a plurality of user equipment.

In this example, the base station 110 and the user equipment 120 are communicating with each other via a downlink (DL) or receive (from the perspective of the user equipment) carrier aggregation (CA) communication link. For instance, the receive CA communication link includes a bidirectional or primary cell (Pcell) link 130 between the base station 110 and the user equipment 120. Additionally, simultaneous or concurrent with the Pcell link 130, the receive CA communication link includes a set of one or more unidirectional or secondary cell (Scell) links 140-1 to 140-N (where N is an integer of one or more) from the base station 110 (or from another base station) to the user equipment 120.

In accordance with the receive CA communication link, the base station 110 may transmit downlink (DL) data to the user equipment 120 via the downlink portion of the Pcell link 130 and the set of one or more Scell links 140-1 to 140-N. By employing a plurality of DL data communication links, higher data throughput and/or more reliable/redundant communication link between the base station 110 and the user equipment 120 may be achieved. The uplink portion of the Pcell communication link 130 may be used, via control signaling, to maintain the receive CA communication link 130 and 140-1 to 140-N between the base station 110 and the user equipment 120.

Figure 2A:
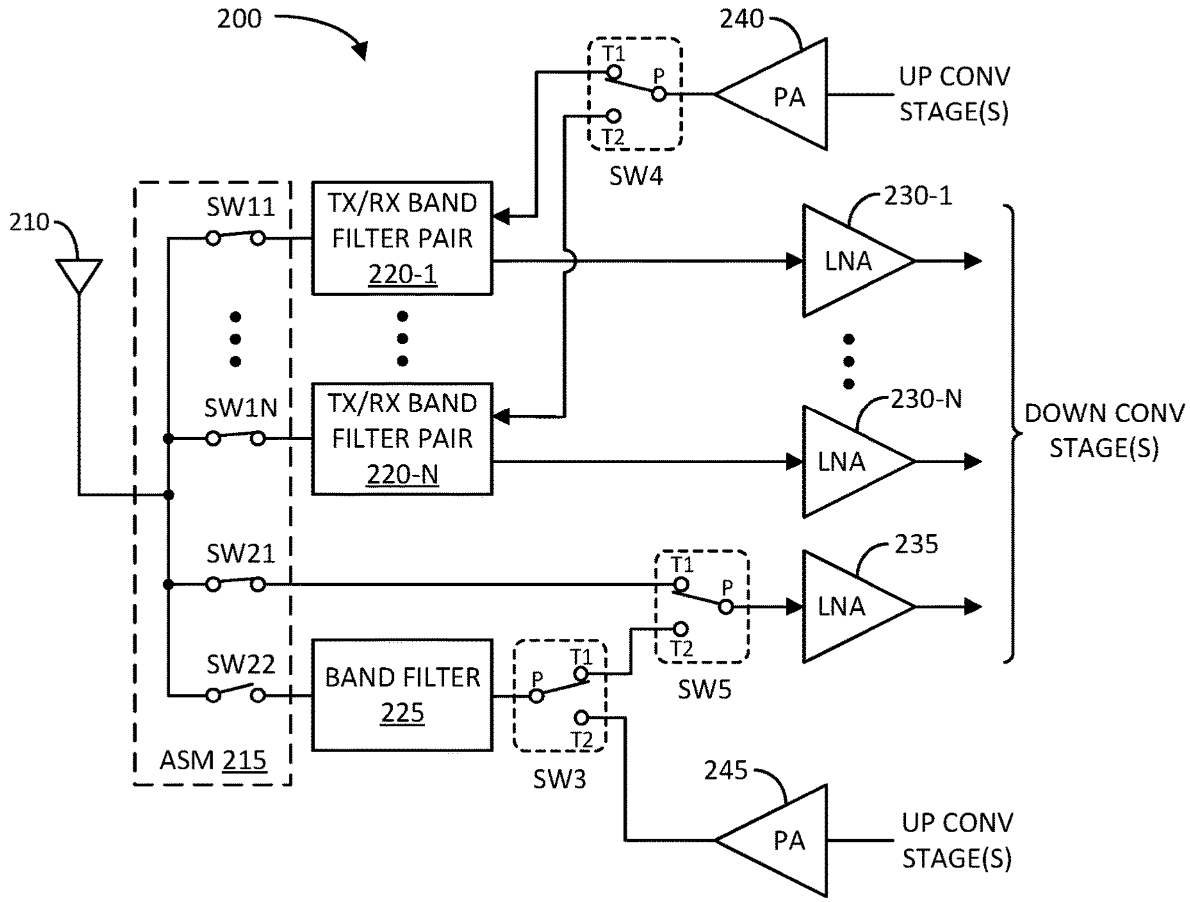
FIG. 2A illustrates a block diagram of an example radio frequency (RF) front end in accordance with another aspect of the disclosure.

FIG. 2A illustrates a block diagram of an example radio frequency (RF) front end 200 in accordance with another aspect of the disclosure. The RF front end 200 may be implemented in the user equipment 120 previously discussed.

In particular, the RF front end 200 includes an antenna 210, and an antenna switch matrix (ASM) 215 including a set of switching devices SW11 to SW1N, SW21, and SW22. The RF front end 200 further includes transmit/receive (Tx/Rx) band filter pairs 220-1 to 220-N, a band filter 225, and a set of switching devices SW3 to SW5, each of which may be implemented functionally and/or structurally as a single pole double (or multiple) throw (SPDT) switching device. Additionally, the RF front end 200 includes a set of low noise amplifiers (LNAs) 230-1 to 230-N and 235, and a set of power amplifiers (PAs) 240 and 245.

The antenna 210 is coupled to common respective first terminals of the set of switching devices SW11 to SW1N, SW21, and SW22 of the ASM 215. The set of switching devices SW11 to SW1N of the ASM 215 include second terminals coupled to first ports of the set of Tx/Rx band filter pairs 220-1 to 220-N, respectively. The switching device SW21 of the ASM 215 includes a second terminal coupled to a first throw terminal (T1) of the switching device SW5. The switching device SW22 of the ASM 215 includes a second terminal coupled to a first port of the band filter 225.

For ease of description, the integer N may be two (2), although it may be another value. Accordingly, the Tx/Rx band filter pairs 220-1 and 220-2 include input ports coupled to first and second throw terminals (T1) and (T2) of switching device SW4, respectively. Additionally, the set of Tx/Rx band filter pairs 220-1 and 220-N (e.g., N=2) include output ports coupled to inputs of the set of LNAs 230-1 to 230-N, respectively. The band filter 225 includes a second port coupled to a pole terminal (P) of the switching device SW3.

The switching device SW4 includes a pole terminal (P) coupled to an output of the PA 240. The PA 240 includes an input coupled to one or more frequency upconverting stages for receiving a transmit RF signal therefrom. Similarly, the switching device SW3 includes a second throw terminal (T2) coupled to an output of the PA 245. The PA 245 includes an input coupled to one or more frequency upconverting stages for receiving a transmit RF signal therefrom.

The switching device SW3 includes a first throw terminal (T1) coupled to a second throw terminal (T2) of the switching device SW5. The switching device SW5, in turn, includes a pole terminal (P) coupled to an input of the LNA 235. The set of LNAs 230-1 to 230-N and LNA 235 include outputs coupled to one or more frequency downconverting stages to provide received RF signals thereto.

In this example, the set of Tx/Rx band filter pairs 220-1 to 220-N pertain to frequency division duplexing (FDD) channels, where each FDD channel may simultaneously receive and transmit RF signals in different frequency bands, respectively. Thus, the set of Tx/Rx band filter pairs 220-1 to 220-N each includes a receive filter and a transmit filter. If, for example, the switching device SW4 is configured to couple its pole (P) to its first throw (T1), a transmit RF signal generated by the PA 240 may be provided to the transmit filter of the Tx/Rx band filter pair 220-1, and an RF signal received via the antenna 210 and closed switching device SW11 may be provided to the receive filter of the Tx/Rx band filter pair 220-1. Similarly, if the switching device SW4 is configured to couple its pole (P) to its second throw (T2), a transmit RF signal generated by the PA 240 may be provided to the transmit filter of the Tx/Rx band filter pair 220-2 (e.g., where N=2), and an RF signal received via the antenna 210 and closed switching device SW12 may be provided to the receive filter of the Tx/Rx band filter pair 220-2.

Further, in accordance with this example, the band filter 225 may pertain to a time division duplexing (TDD) channel, where the band filter 225 is used for receiving an RF signal at a particular time and used for transmitting an RF signal at another, non-overlapping time. Thus, if the band filter 225 is used for RF transmission, the switching device SW22 is closed and the switching device SW3 is configured to couple its pole (P) to its second throw terminal (T2) to receive the transmit RF signal from the PA 245. The transmit RF signal is then filtered by the band filter 225 and provided to the antenna 210 via switching device SW22 for wireless transmission. If the band filter 225 is used for RF reception, the switching device SW22 is closed to receive an RF signal from the antenna 210, and the switching device SW3 is configured to couple its pole (P) to its first throw terminal (T1) to provide the received RF signal to the LNA 235 via the switching device SW5, which is configured to couple its second throw (T2) to its pole (P).

In some RF signal reception configurations, the band filter 225 may be bypassed so that the received RF signal is not subjected to the insertion loss of the band filter 225. In this configuration, the switching device SW21 is closed, the switching device SW22 is open, and the switching device SW5 is configured to couple its first throw terminal (T1) to its pole terminal (P). Accordingly, the RF signal received via the antenna 210 is provided to the LNA 235 via the switching devices SW21 and SW5. Thus, the received RF signal bypasses the band filter 225, which may result in an increase in the sensitivity (e.g., ~two (2) decibels (dB)) for the associated received chain. If, however, there is an RF jammer (e.g., an unwanted RF signal for that particular received chain), whether its origin is external or internal with regard to the RF front end 200, the bypassing of the band filter 225 may cease with the opening of switching device SW21, closing of switching device SW22, and configuring the switching device SW5 so that its second throw terminal (T2) is coupled to its pole terminal (P).

With regard to the downlink (DL) or receive carrier aggregation (CA) scenario described with reference to wireless communication system 100, the LNA 235 and PA 245 may pertain to the bidirectional Pcell communication link 130, and the set of one or more LNAs 230-1 to 230-N may pertain to the one or more unidirectional Scell communication links 140-1 to 140-N, respectively. In this receive CA configuration, the set of one or more switching devices SW11 to SW1N are closed to provide the one or more FDD received RF signals to the set of one or more LNAs 230-1 to 230-N via the set of one or more receive filters of the set of one or more Tx/Rx band filter pairs 220-1 to 220-N, respectively. Per this configuration, there may be no FDD transmit RF signal.

Further, in accordance with this receive CA configuration, during TDD RF signal reception, the switching device SW22 is closed, the switching device SW3 is configured to couple its pole terminal (P) to its first throw terminal (T1), and the switching device SW5 is configured to couple its second throw terminal (T2) to its pole terminal (P). Thus, the TDD RF signal is routed from the antenna 210 to the LNA 235 via switching device SW22, band filter 225, and switching devices SW3 and SW5. During TDD RF signal transmission, the switching device SW22 is closed, the switching device SW21 is open, and the switching device SW3 is configured to couple its pole terminal (P) to its second throw terminal (T2). Thus, the TDD RF signal is routed from the PA 245 to the antenna 210 via switching device SW3, band filter 225, and switching device SW22.

In the aforementioned receive CA scenario, the band filter 225 may not be bypassed during RF reception to improve the sensitivity of the associated receive chain because of impedance issues. For instance, considering the example where the receive filters for Tx/Rx band filter pairs 220-1 and 220-2 (e.g., N=2) are turned to the bands N66 (e.g., substantially 2100-2200 mega Hertz (MHZ) passband) and N25 (e.g., substantially 1930-1995 MHz passband), and the band filter 225 is tuned to band N41 (e.g., 2496-2690 MHZ passband) as defined by the Fifth Generation New Radio (5G NR) developed by 3$^{rd}$ Generation Partnership Project (3GPP), the filters 220-1, 220-2, and 225 may be coupled to a common point (e.g., the antenna 210 or the first terminal of the ASM 215) if their impedances in the others passbands are relatively high (e.g., 300 Ohms (Ω)) compared to their own passband impedances (e.g., 50Ω). In this manner, the filters 220-1, 220-2, and 225 are effectively isolated from each other with regard to their passbands.

However, if the bypassing of band filter 225 is enabled, (e.g., SW21 closed, SW22 open, SW5 with T1-P coupling configuration), the input of the LNA 235 presents substantially 5052 across the passbands of the filters 220-1 and 220-2. As such, the received chain associated with LNA 235 steals received RF signals (e.g., 3 dB) from the received chains associated with filters/LNAs 220-1/230-1 and 220-2/230-2, respectively. Thus, any improvement in the sensitivity of received chain associated with LNA 235 due to the filter bypassing degrades the sensitivity of the received chains associated with filters/LNAs 220-1/230-1 and 220-2/230-2.

Further, in such receive CA configuration, if any of the FDD chains 220-1 to 220-N is implemented as the Pcell bidirectional communication link 130 of wireless communication system 100, and the received chain associated with LNA 235 is implemented as the Scell unidirectional communication link 140-1, the band filter 225 may also not be bypassed during RF reception to improve the sensitivity of the associated receive chain because the transmission of the FDD RF signal would saturate the LNA 235, effectively destroying the signal-to-noise ratio (SNR) of the received RF signal associated with that receive chain.

Figure 2B:
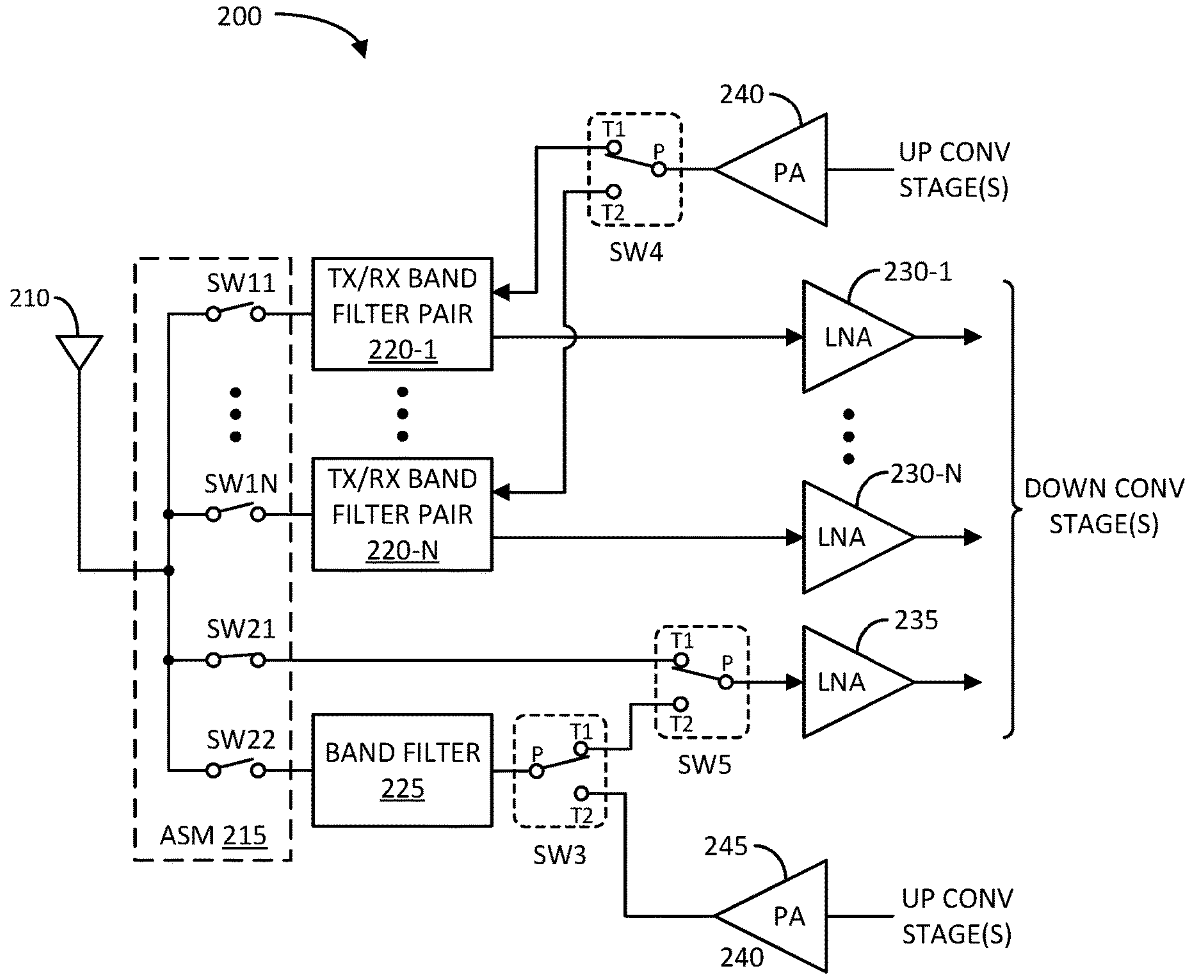
FIG. 2B illustrates a block diagram of the example radio frequency (RF) front end of FIG. 2A in a secondary cell (SCell) deactivated configuration in accordance with another aspect of the disclosure.

FIG. 2B illustrates a block diagram of the example radio frequency (RF) front end 200 in a secondary cell (SCell) deactivated configuration in accordance with another aspect of the disclosure. One solution to the impedance problem discussed above with regard to the receive CA configuration is to open the switching devices SW11 to SW12 (e.g., N=2) when the RF front end 200 is not receiving the Scell RF signals, and bypass the band filter 225 (e.g., SW21 closed, SW22, open, and SW4 T1-P coupling) when receiving the Pcell RF signal. As the filters 220-1, 220-2, and 225 are not connected to a common node, the impedance of the bypass receive chain is no longer a factor. However, this configuration does not take advantage of the higher data throughput provided by carrier aggregation.

Figure 2C:
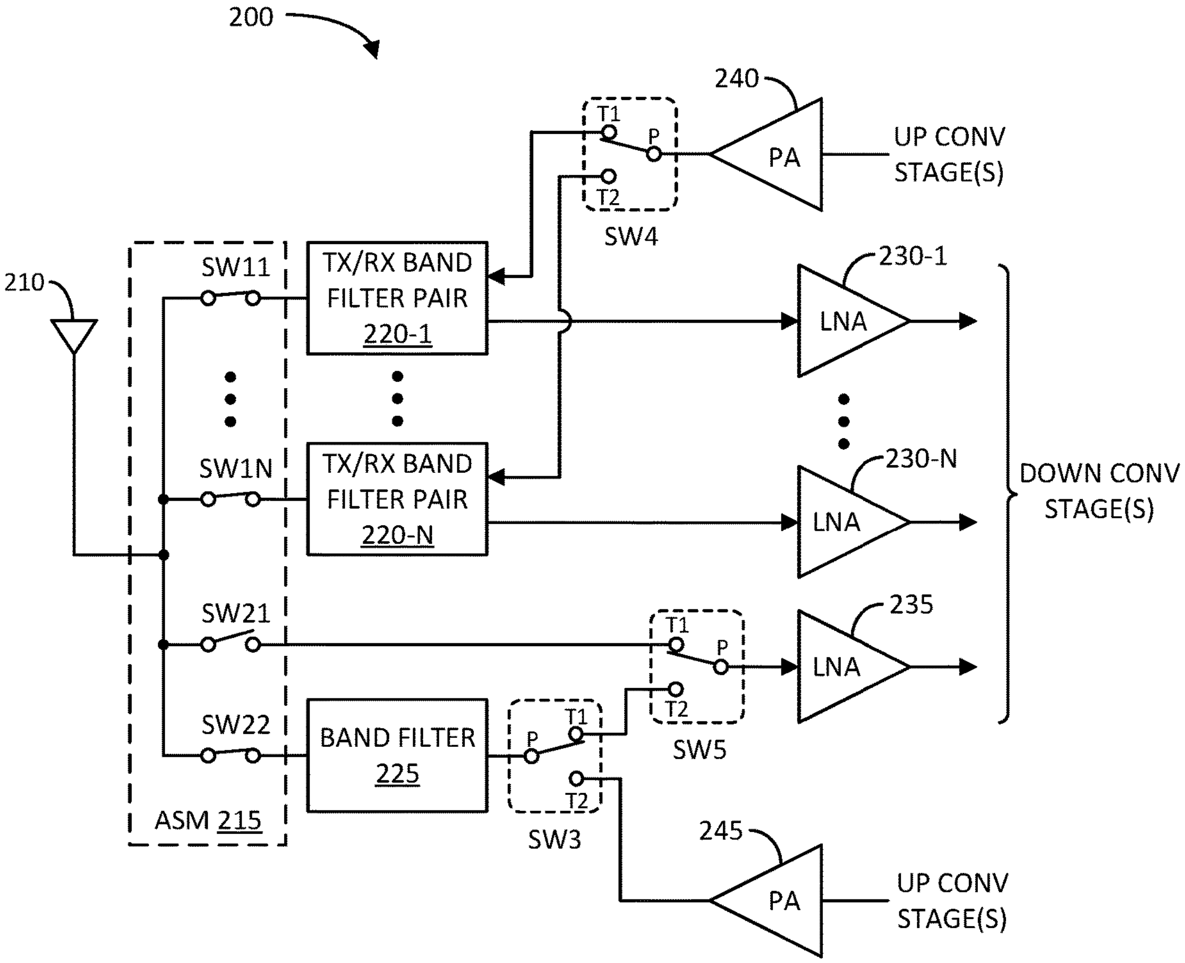
FIG. 2C illustrates a block diagram of the example radio frequency (RF) front end of FIG. 2A in a secondary cell (SCell) activated configuration in accordance with another aspect of the disclosure.

FIG. 2C illustrates a block diagram of the example radio frequency (RF) front end 200 in a secondary cell (SCell) activated configuration in accordance with another aspect of the disclosure. When receive carrier aggregation for higher data throughput is desired, the switching devices SW11 to SW12 (e.g., N=2) are closed to enable the Scell receive chains associated with filters/LNAs 220-1/230-1 and 220-2/230-2, and the band filter 225 of the Pcell receive chain is not bypassed (it is enabled) (e.g., SW22 closed, SW3 P-T1 coupling, and SW5 T2-P coupling). Thus, in this configuration, receive carrier aggregation is effectuated. However, bypassing of the band filter 225 to improve the sensitivity of the Pcell receive chain may not be available as the impedance issue would adversely affect the Scell receive chains.

Figure 3A:
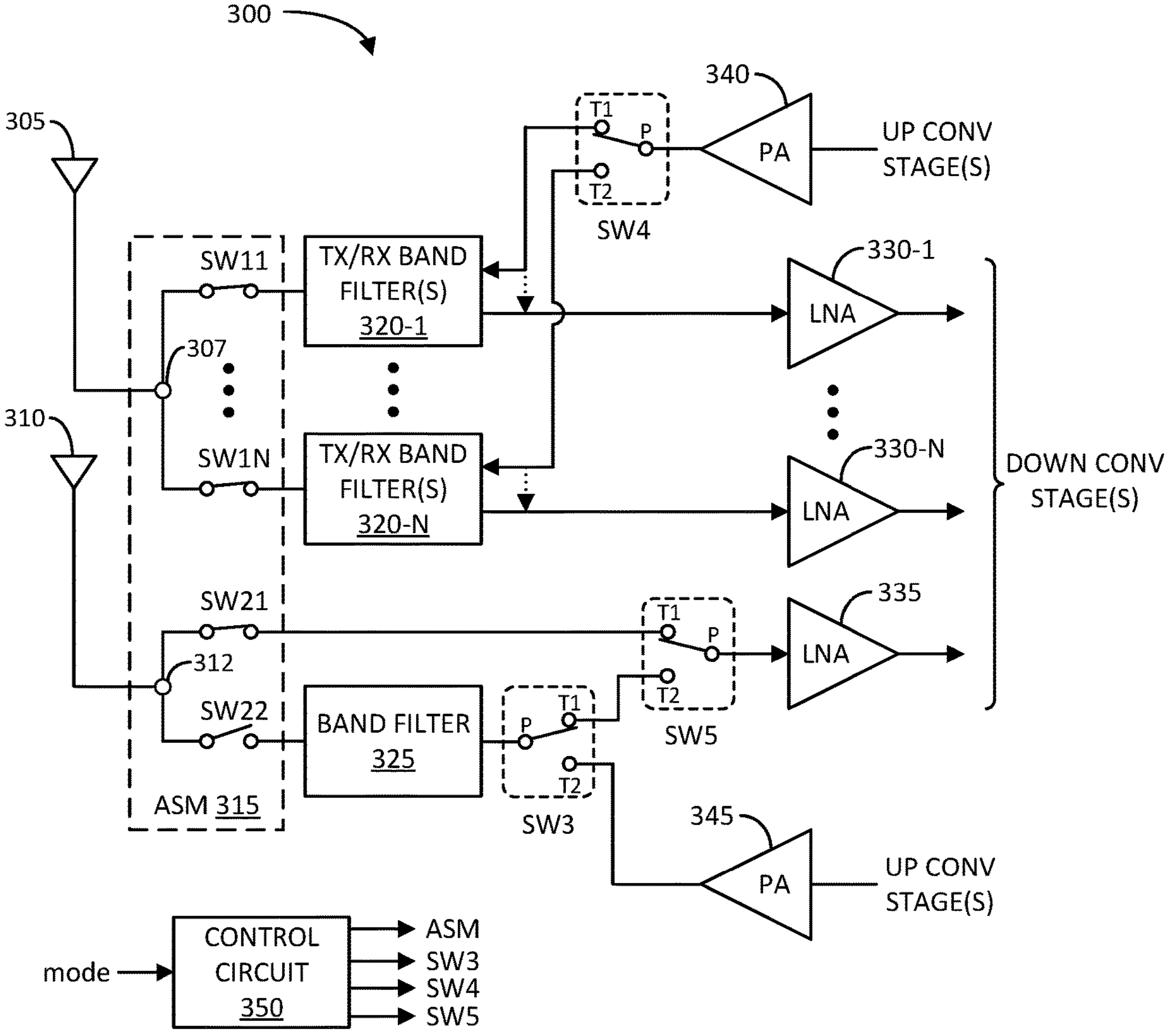
FIG. 3A illustrates a block diagram of another example radio frequency (RF) front end in a receive-receive carrier aggregation configuration in accordance with another aspect of the disclosure.

FIG. 3A illustrates a block diagram of another example radio frequency (RF) front end 300 in a receive-receive carrier aggregation configuration in accordance with another aspect of the disclosure. The RF front end 300 may be implemented in the user equipment 120 previously discussed. As discussed in more detail further herein, the RF front end 300 includes multiple antenna feeds for two (or more) antennas (or antenna ports if the antennas are not part of the RF front end as defined). The one or more Scell receive chains are coupled to one of the antennas or antenna ports, and the Pcell receive chain is coupled to the other antenna or antenna port. In such configuration, the one or more Scell receive chains does not share a common node with the Pcell receive chain; thereby, eliminating the impedance issues mentioned with respect to RF front end 200. Accordingly, the band filter for the Pcell receive chain may be bypassed during reception per a receive carrier aggregation (CA) configuration with the one or more Scell receive chains.

In particular, the RF front end 300 includes a first antenna 305, a second antenna 310, and an antenna switch matrix (ASM) 315 including a pair of antenna ports 307 and 312, and a set of switching devices SW11 to SW1N, SW21, and SW22. The RF front end 300 further includes a set of one or more transmit/receive (Tx/Rx) band filter(s) 320-1 to 320-N, a band filter 325, and a set of switching devices SW3 to SW5, each of which may be implemented functionally and/or structurally as a single pole double (or multiple) throw (SPDT) switching device. Additionally, the RF front end 300 includes a set of low noise amplifiers (LNAs) 330-1 to 330-N and 335, and a set of power amplifiers (PAs) 340 and 345.

The first antenna 305 is coupled to the antenna port 307 of the ASM 315, which is coupled to respective first terminals of the set of one or more switching devices SW11 to SW1N. The second antenna 310 is coupled to the antenna port 312 of the ASM 315, which is coupled to respective first terminals of the switching devices SW21, and SW22. The set of one or more switching devices SW11 to SW1N of the ASM 215 include second terminals coupled to first ports of the set of one or more Tx/Rx band filters 320-1 to 320-N, respectively. The switching device SW21 of the ASM 315 includes a second terminal coupled to a first throw terminal (T1) of the switching device SW5. The switching device SW22 of the ASM 315 includes a second terminal coupled to a first port of the band filter 225.

For case of description, the integer N may be two (2), although it may be another value. In the previous RF front end 200, the one or more Scell receive chains were described as FDD receive chains. However, in RF front end 300, the one or more Scell receive chains may be FDD or TDD. Accordingly, the Tx/Rx band filter(s) 320-1 and 320-2 include ports coupled to first and second throw terminals (T1) and (T2) of switching device SW4, respectively. Additionally, the set of Tx/Rx band filter pairs 320-1 and 320-N (e.g., N=2) include the same (e.g., TDD) or different (e.g., FDD) ports coupled to inputs of the set of one or more LNAs 330-1 to 330-N, respectively. The band filter 325 includes a second port coupled to a pole terminal (P) of the switching device SW3.

The switching device SW4 includes a pole terminal (P) coupled to an output of the PA 340. The PA 340 includes an input coupled to one or more frequency upconverting stages for receiving a transmit RF signal therefrom. Similarly, the switching device SW3 includes a second throw terminal (T2) coupled to an output of the PA 345. The PA 345 includes an input coupled to one or more frequency upconverting stages for receiving a transmit RF signal therefrom.

The switching device SW3 includes a first throw terminal (T1) coupled to a second throw terminal (T2) of switching device SW5. The switching device SW5, in turn, includes a pole terminal (P) coupled to an input of the LNA 335. The set of one or more LNAs 330-1 to 330-N and LNA 335 includes outputs coupled to one or more frequency downconverting stages to provide received RF signals thereto.

As mentioned, the set of one or more Tx/Rx band filters 320-1 to 320-N may pertain to FDD or TDD channels. If pertaining to FDD channel(s), the Scell receive chain(s) may simultaneously receive and transmit RF signals within substantially non-overlapping passbands. In such case, the set of one or more Tx/Rx band filters 320-1 to 320-N each includes a receive filter and a transmit filter. In such case, the set of one or more Tx/Rx band filters 320-1 to 320-N each includes a receive filter with an output coupled to the corresponding LNA and a transmit filter with an input coupled to the switching device SW4. If pertaining to TDD channel(s), the Scell receive chain(s) may receive RF signals at a particular time and transmit RF signals at another non-overlapping time. In such case, the set of one or more Tx/Rx band filters 320-1 to 320-N each includes a filter including a port coupled to both the corresponding LNA and the switching device SW4 (as indicated by the dotted arrow).

Further, in accordance with this example, the band filter 325 may pertain to a TDD channel, where the band filter 325 is used for receiving an RF signal at a particular time and used for transmitting an RF signal at another non-overlapping time. Thus, if the band filter 325 is used for RF transmission, the switching device SW22 is closed and the switching device SW3 is configured to couple its pole terminal (P) to its second throw terminal (T2) to receive the transmit RF signal from the PA 345. If the band filter 325 is used for RF reception, the switching device SW22 is closed to receive an RF signal from the second antenna 310, and the switching device SW3 is configured to couple its pole terminal (P) to its first throw terminal (T1) to provide the received RF signal to the LNA 335 via the switching device SW5, which is configured to couple its second throw terminal (T2) to its pole terminal (P).

The configuration of the RF front end 300 shown in FIG. 3A is a receive-receive CA configuration where the Pcell and one or more Scell chains are in receive mode. In this mode, the set of one or more switching devices SW11 to SW1N pertaining to the Scell chain are closed so that the one or more received RF signals are filtered by the set of one or more Tx/Rx band filters 320-1 to 320-N and provided to the set of one or more LNAs 330-1 to 330-N for amplification and further processing downstream. Also, in this mode, the band filter 325 pertaining to the Pcell chain is bypassed (e.g., SW21 closed, SW22 open, and SW5 T1-P coupling) so that the RF signal received by the second antenna 310 is provided to the LNA 335 via switching devices SW21 and SW5 for amplification and further processing downstream. The RF front end 300 may include a control circuit 350 configured to set the ASM 315 and switching devices SW1 to SW5 in the aforementioned configuration in accordance with a mode signal indicating the receive-receive CA configuration.

Figure 3B:
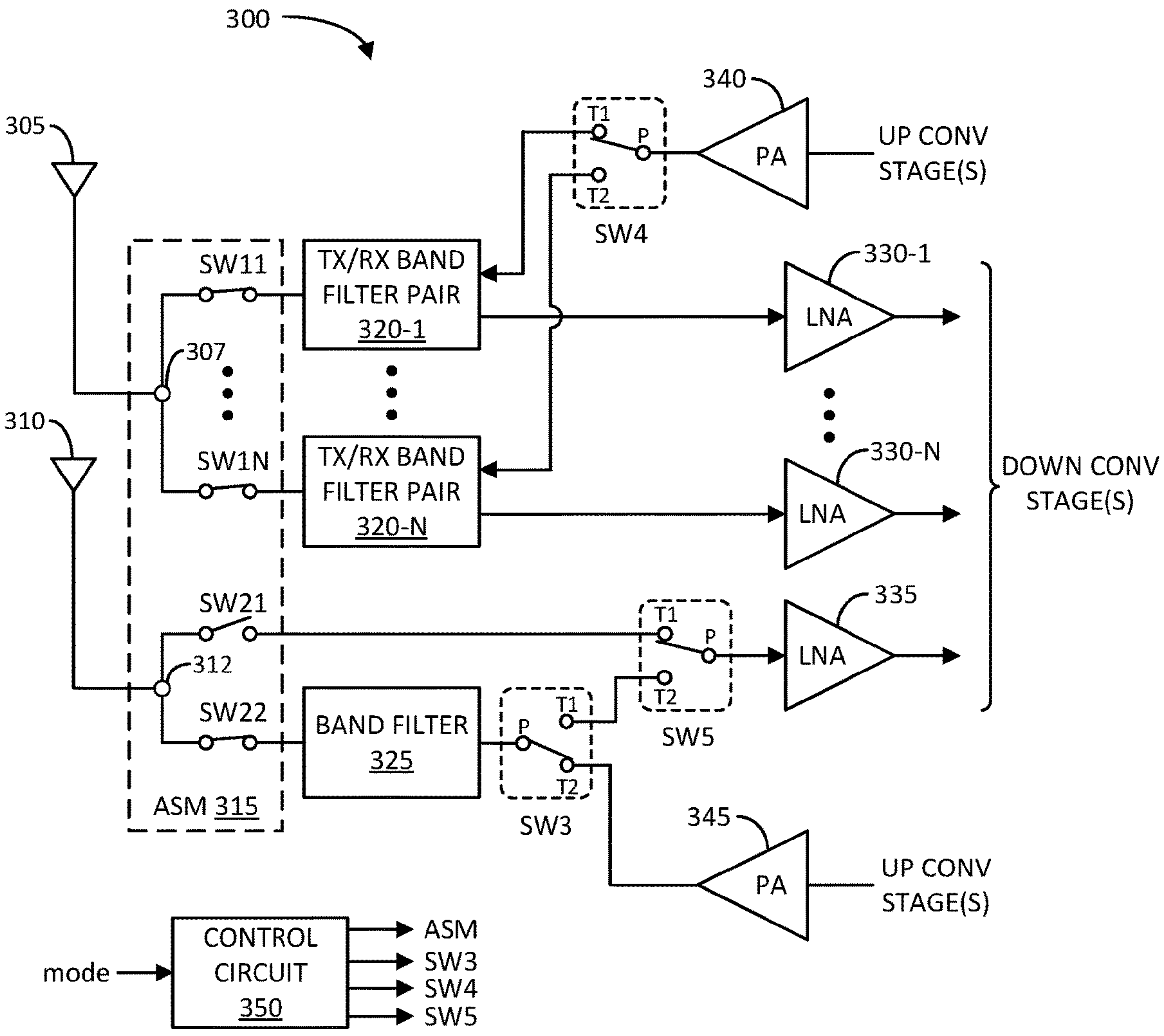
FIG. 3B illustrates a block diagram of the example radio frequency (RF) front end of FIG. 3A in a transmit-receive carrier aggregation configuration in accordance with another aspect of the disclosure.

FIG. 3B illustrates a block diagram of the example radio frequency (RF) front end 300 in a transmit-receive carrier aggregation (CA) configuration in accordance with another aspect of the disclosure. The configuration of the RF front end 300 shown in FIG. 3B is a transmit-receive CA configuration where the Pcell is in transmit mode for maintaining the receive CA configuration with the base station, and the one or more Scell chains are in receive mode. In this mode, the set of one or more switching devices SW11 to SW1N pertaining to the Scell chain are closed so that the one or more received RF signals received from the first antenna 305 via the antenna port 307 are filtered by the set of one or more Tx/Rx band filters 320-1 to 320-N and provided to the set of one or more LNAs 330-1 to 330-N for amplification and further processing downstream. Also, in this mode, the band filter 325 pertaining to the Pcell chain is active or not bypassed (e.g., SW21 open, SW22 closed, and SW3 P-T2 coupling) so that the RF signal generated by the PA 354 is filtered by the band filter 325 and provided to the second antenna 310 via the second antenna port 312 for free space radiation. Similarly, the control circuit 350 is configured to set the ASM 315 and switching devices SW1 to SW5 in accordance with the aforementioned configuration based on the mode signal indicating the transmit-receive CA configuration.

Figure 4:
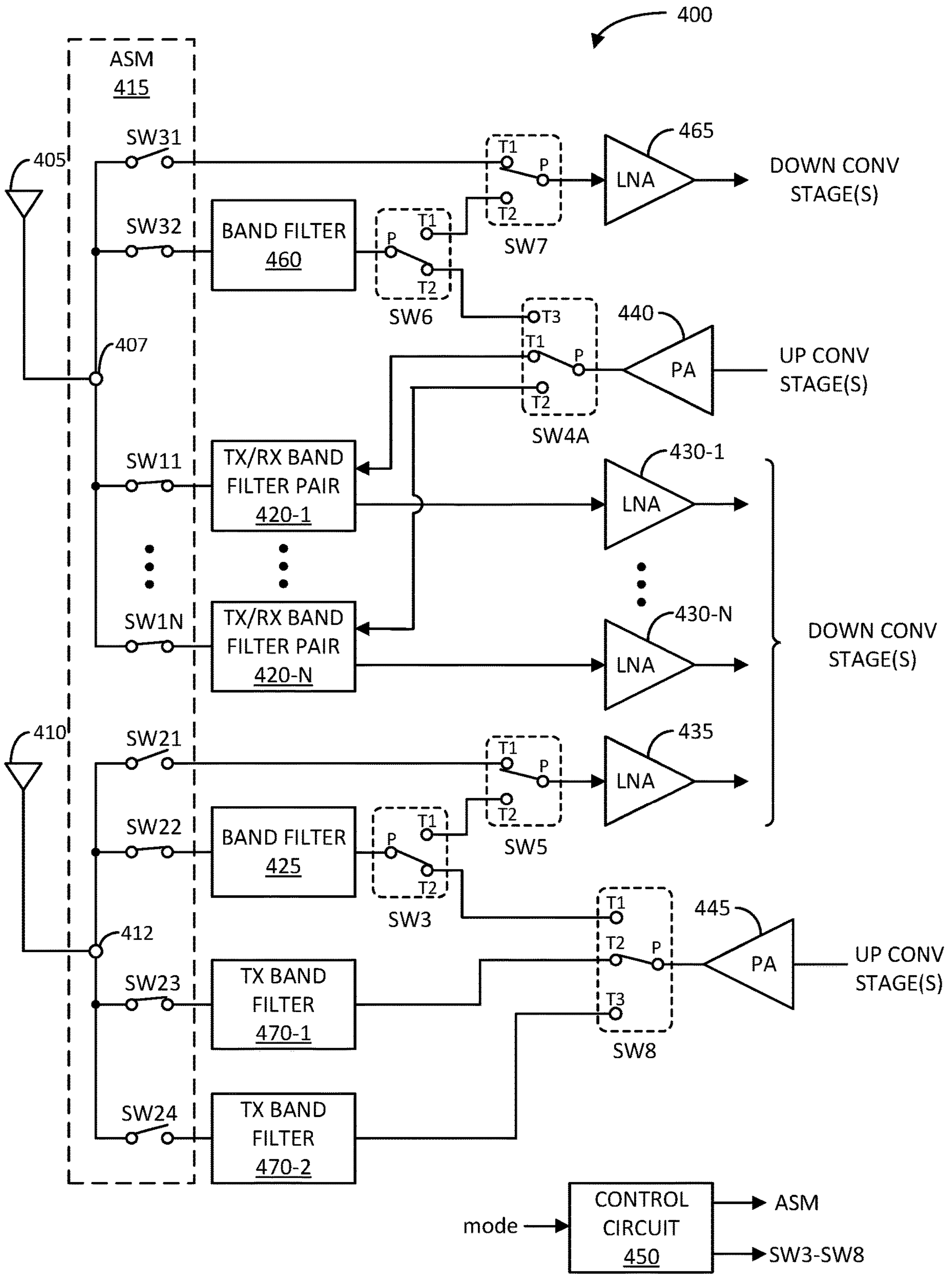
FIG. 4 illustrates a block diagram of another example radio frequency (RF) front end in accordance with another aspect of the disclosure.

FIG. 4 illustrates a block diagram of another example radio frequency (RF) front end 400 in accordance with another aspect of the disclosure. The RF front end 400 may be an extended implementation of RF front end 300 previously discussed. Accordingly, for case of description, components of RF front end 400 corresponding to components of RF front end 300 are labeled the same (e.g., switching devices) and with the most significant digit as a "4" (e.g., antennas, filters, LNAs, and PAs) instead of a "3".

The RF front end 400 further includes a receive/transmit chain associated with antenna 405 (e.g., similar to the receive/transmit chain associated with antenna 410 including switching devices SW21 and SW22 of ASM 415, bypassable band filter 425, switching devices SW3, SW4 and SW5, and LNA 435 previously discussed in detail with reference to RF front end 300) including switching devices SW31 and SW32 of ASM 415, bypassable band filter 460, switching devices SW6 and SW7, and LNA 465, respectively. Thus, the band filter 450 may be bypassed in receive mode by the control circuit 450 closing switching device SW31, opening switching device SW32, configuring switching device SW6 to couple the pole (P) to terminal (T2), and configuring switching device SW7 to couple the pole (P) to terminal (T1). If, in receive mode, it is desired to not bypass the band filter 460, the control circuit 450 may open switching device SW31, close switching device SW32, configure switching device SW6 to couple the pole (P) to terminal (T1), and configure the switching device SW7 to couple the pole (P) to terminal (T2). In transmit mode, the control circuit 450 may open switching device SW31, close switching device SW32, configure switching device SW6 to couple the pole (P) to terminal (T2), and configure the switching device SW4A (e.g., modified switching device SW4) to couple the pole (P) to terminal (T3).

Associated with antenna 410, the RF front end 400 further includes a transmit chain including switching device SW8, Tx band filters 470-1 and 470-2, and switching devices SW23 and SW24 of ASM 415. The switching device SW8 includes a pole (P) coupled to an output of the PA 445, a first terminal (T1) coupled to the second terminal (T2) of switching device SW3, a second terminal (T2) coupled to an input of Tx band filter 470-1, and a third terminal (T3) coupled to an input of Tx band filter 470-2. The switching device SW23 and SW24 are coupled between the antenna port 412 and outputs of the Tx band filters 470-1 and 470-2, respectively. Accordingly, the control circuit 450 may control the switching devices SW8, SW23, and SW24 to route the transmit RF signal generated by the PA 445 to the antenna port 412 via either the band filter 425 (e.g., SW8 P-T1, SW3 P-T2, and closed SW22), the Tx band filter 470-1 (e.g., SW8 P-T2 and closed SW23) or Tx band filter 470-2 (e.g., SW8 P-T3 and closed SW24).

Figure 5:
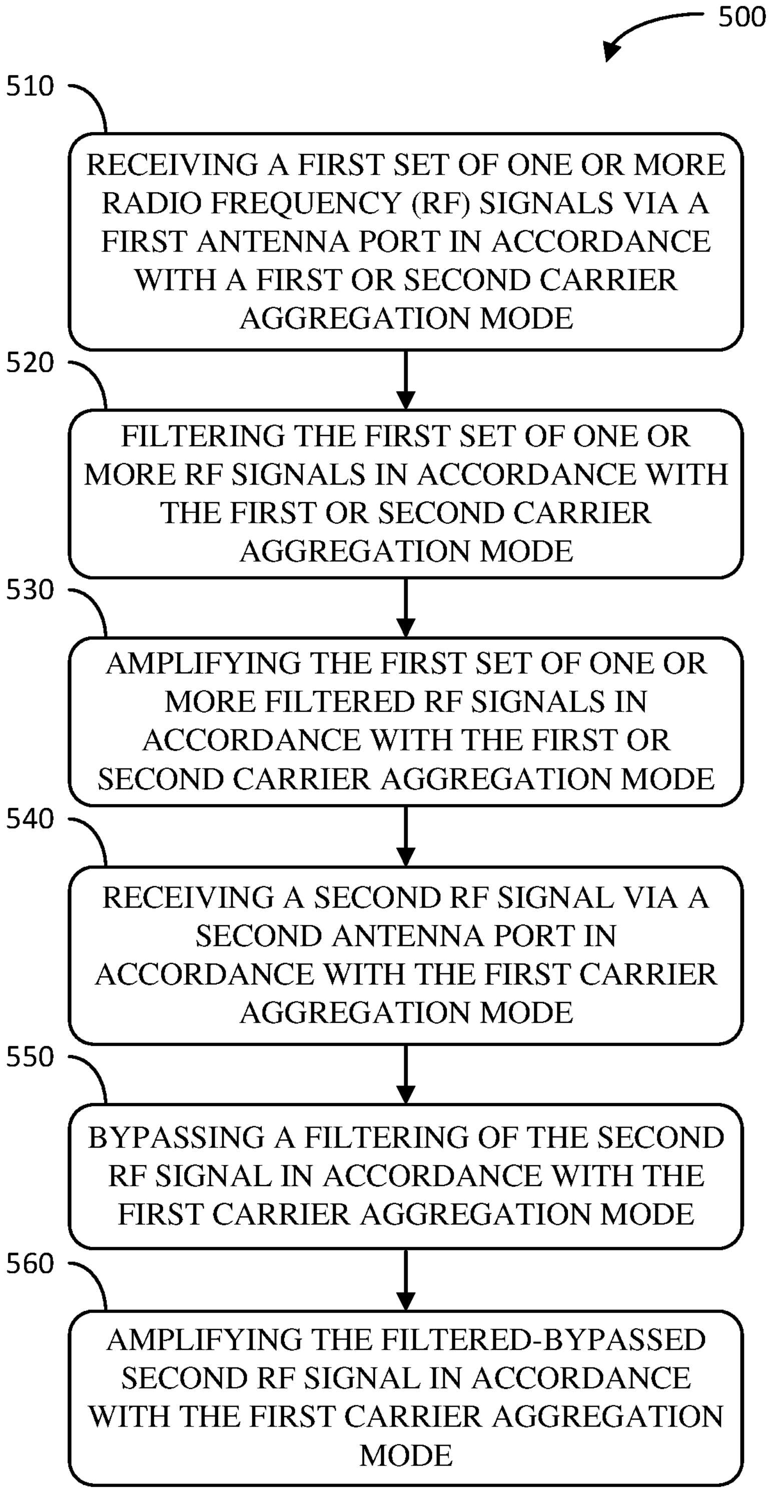
FIG. 5 illustrates a flow diagram of an example method of processing receive carrier aggregation signals in accordance with another aspect of the disclosure.

FIG. 5 illustrates a flow diagram of an example method 500 of processing receive carrier aggregation signals in accordance with another aspect of the disclosure. The method 500 includes receiving a first set of one or more radio frequency (RF) signals via a first antenna port in accordance with a first or second carrier aggregation mode (block 510). Examples of means for receiving a first set of one or more radio frequency (RF) signals via a first antenna port in accordance with a first or second carrier aggregation mode include the set of one or more switching devices SW11 to SW1N of the ASM 315.

The method 500 further includes filtering the first set of one or more RF signals in accordance with the first or second carrier aggregation mode (block 520). Examples of means for filtering the first set of one or more RF signals in accordance with the first or second carrier aggregation mode include the set of one or more Tx/Rx band filters 320-1 to 320-N. Additionally, the method 500 includes amplifying the first set of one or more filtered RF signals in accordance with the first or second carrier aggregation mode (block 530). Examples of means for amplifying the first set of one or more filtered RF signals in accordance with the first or second carrier aggregation mode include the set of one or more LNAs 330-1 to 330-N.

The method 500 also includes receiving a second RF signal via a second antenna port in accordance with the first carrier aggregation mode (block 540). An example of means for receiving a second RF signal via a second antenna port in accordance with the first carrier aggregation mode includes the switching device SW21. Further, the method 500 includes bypassing a filtering of the second RF signal in accordance with the first carrier aggregation mode (block 550). Examples of means for bypassing a filtering of the second RF signal in accordance with the first carrier aggregation mode includes the switching devices SW21 and SW5. Additionally, the method 500 includes amplifying the filter-bypassed second RF signal in accordance with the first carrier aggregation mode (block 560). An example of means for amplifying the filter-bypassed second RF signal in accordance with the first carrier aggregation mode includes the LNA 335.

The method 500 may further include generating a third RF signal in accordance with the second carrier aggregation mode. An example of means for generating a third RF signal in accordance with the second carrier aggregation mode includes the PA 345. Additionally, the method 500 includes filtering the third RF signal in accordance with the second carrier aggregation mode. An example of means for filtering the third RF signal in accordance with the second carrier aggregation mode includes the band filter 325. Further, the method 500 includes providing the filtered third RF signal to the second antenna port in accordance with the second carrier aggregation. An example of means for providing the filtered third RF signal to the second antenna port in accordance with the second carrier aggregation includes the switching device SW22.

Figure 6:
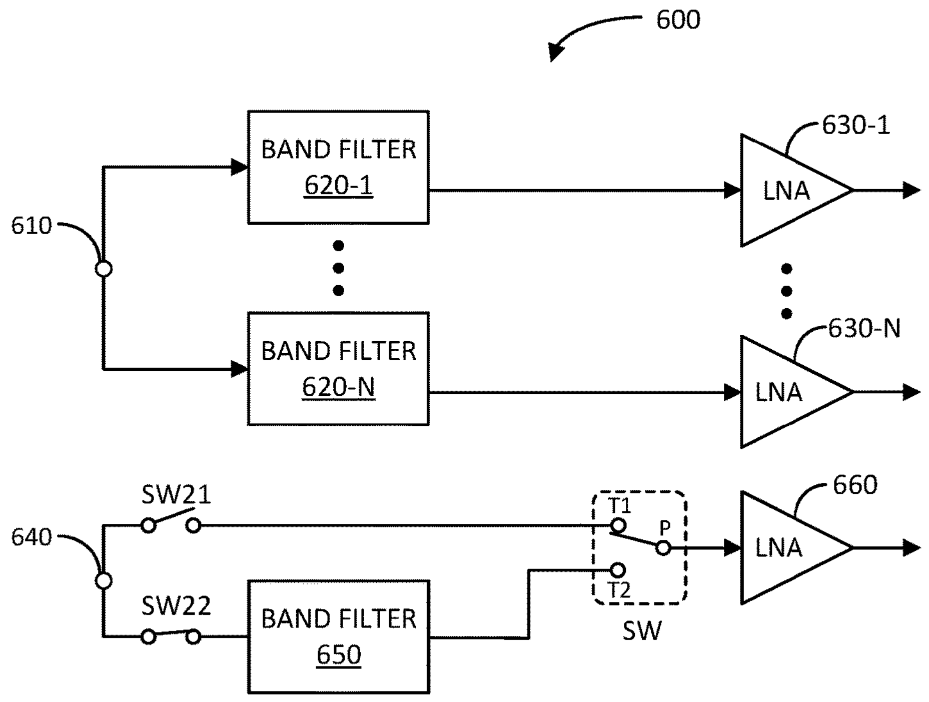
FIG. 6 illustrates a block diagram of another example radio frequency (RF) front end in accordance with another aspect of the disclosure.

FIG. 6 illustrates a block diagram of another example radio frequency (RF) front end 600 in accordance with another aspect of the disclosure. The RF front end 600 may be implemented in the user equipment 120 previously discussed.

In particular, the RF front end 600 includes a first antenna port 610, a first set of one or more band filters 620-1 to 620-N coupled to the first antenna port 610, and a first set of one or more low noise amplifiers (LNAs) 630-1 to 630-N coupled to the first set of one or more band filters 620-1 to 620-N, respectively. Additionally, the RF front end 600 includes a second antenna port 640, a second band filter 650, a second low noise amplifier (LNA) 660, a first switching device SW21 coupled between the second antenna port 640 and the second LNA 660, and a second switching device SW22 coupled between the second antenna port 640 and the second band filter 650. The operation of the RF front end 600 may be similar to that of RF front end 300 previously discussed.

Figure 7:
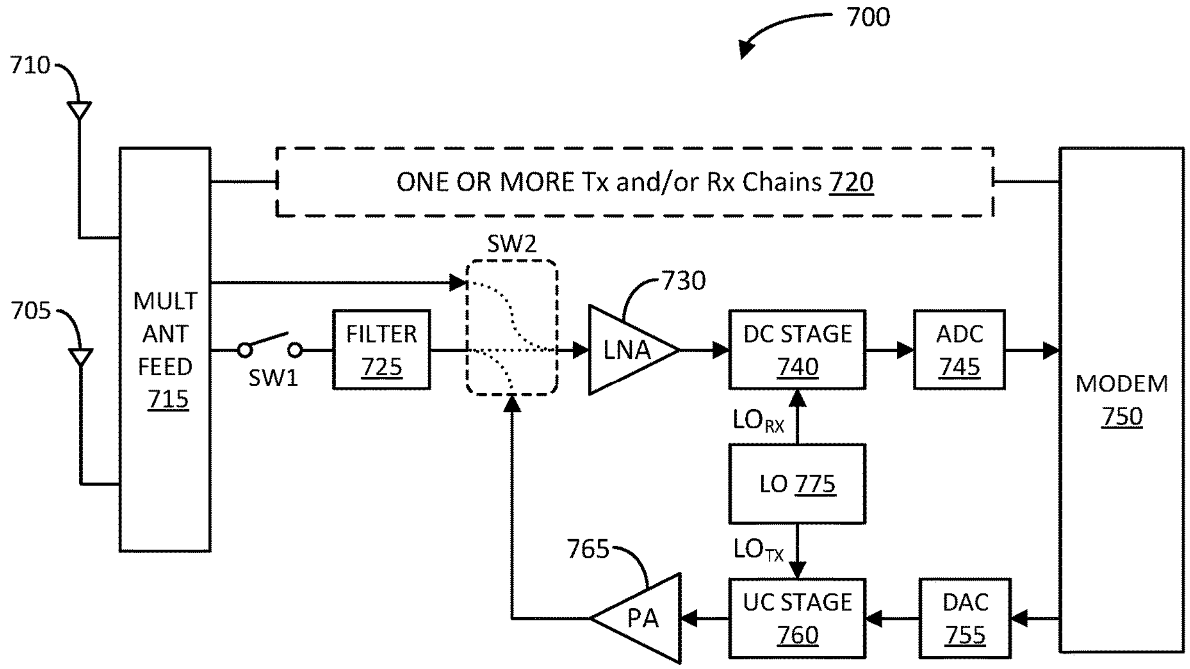
FIG. 7 illustrates a block diagram of an example transceiver in accordance with another aspect of the disclosure.

FIG. 7 illustrates a block diagram of an example transceiver 700 in accordance with another aspect of the disclosure. The transceiver 700 may be part of a user equipment (UE), such as a mobile device, smart phone, or other wireless communication device. The transceiver 700 may include the RF front end 300 previously discussed.

The transceiver 700 includes a set of antennas 705 and 710 (or more), a multiple antenna feed 715, a set of one or more transmit (Tx) and/or receive (Rx) chains 720, a time division duplexing (TDD) Tx/Rx chain including first and second switching devices SW1 and SW2, band filter 725, low noise amplifier 730, one or more frequency downconverting (DC) stages 740, an analog-to-digital converter (ADC) 745, a digital-to-analog converter (DAC) 755, one or more frequency upconverting stages 760, a power amplifier (PA) 765, and a local oscillator (LO) 775, and a modem 750.

With regard to the RF front end 300, the antennas 705 and 710 may correspond to antennas 310 and 305, the multiple antenna feed 715 may correspond to a portion of the ASM 315, the switching device SW1 may correspond to switching device SW22, the band filter 725 may correspond to band filter 325, the switching device SW2 may correspond to switching devices SW21, SW3, and SW5, the LNA 730 may correspond to LNA 335, the PA 765 may correspond to PA 345, and the one or more Tx and/or Rx chains 720 may correspond to filters 320-1 to 320-N, LNAs 330-1 to 330-N, switching device SW4, and PA 340. These elements have been discussed in detail with respect to RF front end 300.

With regard to signal reception, the one or more DC stages 740 frequency down converts an RF signal received via the LNA 730 using a receive local oscillator signal LORX generated by the LO 775 to generate a receive baseband (BB) signal, and the ADC 745 digitizes the received BB signal and provides it to the modem 750 for further processing (e.g., extraction of data). With regard to signal transmission, the modem 750 generates a digital transmit BB signal, the DAC 755 converts the digital transmit BB signal into an analog transmit BB signal, the one or more UC stages 760 frequency upconverts the analog transmit BB signal to generate a transmit RF signal using a transmit local oscillator signal LOTx generated by the LO 775, and the PA 765 amplifies the transmit RF signal as previously discussed. The one or more Tx and/or Rx chains 720 may include similar downconverting and upconverting stages, LOs, ADCs, and DACs for processing received and transmit signals, some of which may be pursuant to carrier aggregation applications as previously discussed.

The following provides an overview of aspects of the present disclosure:

Aspect 1: An apparatus, comprising: a first antenna port; a first set of one or more band filters coupled to the first antenna port; a first set of one or more low noise amplifiers (LNAs) coupled to the first set of one or more band filters, respectively; a second antenna port; a second band filter; a second low noise amplifier (LNA); a first switching device coupled between the second antenna port and the second LNA; and a second switching device coupled between the second antenna port and the second band filter.

Aspect 2: The apparatus of aspect 1, further comprising a control circuit configured to close the first switching device based on a first receive carrier aggregation mode.

Aspect 3: The apparatus of aspect 2, wherein based on the first carrier aggregation mode: the first set of one or more band filters is configured to filter a first set of one or more radio frequency (RF) signals received via the first antenna port, respectively; the first set of one or more LNAs is configured to amplify the first set of one or more filtered RF signals, respectively; and the second LNA is configured to amplify a second radio frequency (RF) signal received via the second antenna port and the first switching device.

Aspect 4: The apparatus of aspect 2 or 3, further comprising a power amplifier (PA), wherein the second band filter is coupled between the PA and the second switching device.

Aspect 5: The apparatus of aspect 4, wherein the control circuit is configured to close the second switching device based on a second receive carrier aggregation mode.

Aspect 6: The apparatus of aspect 5, wherein based on the second carrier aggregation mode: the first set of one or more band filters is configured to filter the first set of one or more RF signals received via the first antenna port, respectively; the first set of one or more LNAs is configured to amplify the first set of one or more filtered RF signals, respectively; and the second band filter is configured to filter a third radio frequency (RF) signal generated by the PA for transmission via the second antenna port.

Aspect 7: The apparatus of aspect 6, further comprising: a third switching device including a first terminal coupled to an input of the second LNA, a second terminal coupled to the first switching device, and a third terminal; and a fourth switching device including a first terminal coupled to the second band filter, a second terminal coupled to the third terminal of the second switching device, and a third terminal coupled to an output of the PA; wherein the control circuit is configured to: couple the first terminal to the second terminal of the third switching device based on the first carrier aggregation mode; and couple the first terminal to the third terminal of the fourth switching device based on the second carrier aggregation mode.

Aspect 8: The apparatus of aspect 6 or 7, wherein the second and third RF signals pertain to a time division duplexing (TDD) communication channel.

Aspect 9: The apparatus of any one of aspects 6-8, wherein the second and third RF signals pertain to a primary cell (Pcell) communication link.

Aspect 10: The apparatus of any one of aspects 3-9, wherein the first set of one or more RF signals pertain to a frequency division duplexing (FDD) communication channel.

Aspect 11: The apparatus of any one of aspects 3-9, wherein the first set of one or more RF signals pertain to a time division duplexing (TDD) communication channel.

Aspect 12: The apparatus of any one of aspects 3-11, wherein the first set of one or more RF signals pertains to a secondary cell (Scell) communication link.

Aspect 13: The apparatus of any one of aspects 1-12, wherein the second band filter includes a passband with a frequency range of substantially 2500 to 2700 mega Hertz (MHz).

Aspect 14: The apparatus of any one of aspects 1-13, wherein one of the first set of one or more band filters includes a passband with a frequency range of substantially 1930 to 2000 mega Hertz (MHz).

Aspect 15: The apparatus of any one of aspects 1-14, wherein one of the first set of one or more band filters includes a passband with a frequency range of substantially 2100 to 2200 mega Hertz (MHz).

Aspect 16: The apparatus of any one of aspects 1-15, further comprising: a first antenna coupled to the first antenna port; and a second antenna coupled to the second antenna port.

Aspect 17: The apparatus of any one of aspects 1-16, further comprising a set of one or more switching devices coupled between the first antenna port and the first set of one or more band filters, respectively.

Aspect 18: The apparatus of any one of aspects 1-17, further comprising one or more frequency downconverting stages coupled to the first set of one or more LNAs and the second LNA.

Aspect 19: The apparatus of any one of aspects 1-18, further comprising a power amplifier (PA) coupled to the first set of one or more band filters.

Aspect 20: The apparatus of aspect 19, further comprising one or more frequency upconverting stages coupled to the PA.

Aspect 21: The apparatus of any one of aspects 1-20, further comprising: a power amplifier (PA); and a second set of one or more band filters coupled between the PA and the first antenna port.

Aspect 22: The apparatus of any one of aspects 1-21, wherein the second band filter is coupled between the second switching device and the second LNA.

Aspect 23: The apparatus of aspect 22, further comprising a control circuit configured to open the second switching device and close the first switching device so that a radio frequency (RF) signal received via the second antenna port is provided to the second LNA while bypassing the second band filter.

Aspect 24: The apparatus of any one of aspects 1-23, further comprising: a third band filter; a third low noise amplifier (LNA); a third switching device coupled between the first antenna port and the third LNA; and a fourth switching device coupled between the first antenna port and the third band filter.

Aspect 25: The apparatus of any one of aspects 1-24, further comprising: a power amplifier (PA); a third band filter; a fourth band filter; a third switching device coupled between the PA and the second, third, and fourth band filters, respectively; a fourth switching device coupled between the third band filter and the second antenna port; and a fifth switching device coupled between the fourth band filter and the second antenna port.

Aspect 25: A method, comprising: receiving a first set of one or more radio frequency (RF) signals via a first antenna port in accordance with a first or second carrier aggregation mode; filtering the first set of one or more RF signals in accordance with the first or second carrier aggregation mode; amplifying the first set of one or more filtered RF signals in accordance with the first or second carrier aggregation mode; receiving a second RF signal via a second antenna port in accordance with the first carrier aggregation mode; bypassing a filtering of the second RF signal in accordance with the first carrier aggregation mode; and amplifying the filter-bypassed second RF signal in accordance with the first carrier aggregation mode.

Aspect 26: The method of aspect 25, further comprising: generating a third RF signal in accordance with the second carrier aggregation mode; filtering the third RF signal in accordance with the second carrier aggregation mode; and providing the filtered third RF signal to the second antenna port in accordance with the second carrier aggregation.

Aspect 27: The method of aspect 26, wherein the second and third RF signals pertain to a time division duplexing (TDD) communication channel.

Aspect 28: The method of any one of aspects 25-27, wherein the second RF signal pertain to a primary cell (Pcell) communication link, and the first set of one or more RF signals pertain to a secondary cell (Scell) communication link.

Aspect 29: An apparatus, comprising: means for receiving a first set of one or more radio frequency (RF) signals via a first antenna port in accordance with a first or second carrier aggregation mode; means for filtering the first set of one or more RF signals in accordance with the first or second carrier aggregation mode; means for amplifying the first set of one or more filtered RF signals in accordance with the first or second carrier aggregation mode; means for receiving a second RF signal via a second antenna port in accordance with the first carrier aggregation mode; means for bypassing a filtering of the second RF signal in accordance with the first carrier aggregation mode; and means for amplifying the filter-bypassed second RF signal in accordance with the first carrier aggregation mode.

Aspect 30: The apparatus of aspect 29, further comprising: means for generating a third RF signal in accordance with the second carrier aggregation mode; means for filtering the third RF signal in accordance with the second carrier aggregation mode; and means for providing the filtered third RF signal to the second antenna port in accordance with the second carrier aggregation.

Aspect 31: The apparatus of aspect 30, wherein the second and third RF signals pertain to a time division duplexing (TDD) communication channel.

Aspect 32: The apparatus of any one of aspects 29-31, wherein the second RF signal pertains to a primary cell (Pcell) communication link, and the first set of one or more RF signals pertain to a secondary cell (Scell) communication link.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:

a first antenna port;

a first set of one or more band filters coupled to the first antenna port;

a first set of one or more low noise amplifiers (LNAs) coupled to the first set of one or more band filters, respectively;

a second antenna port;

a second band filter;

a second low noise amplifier (LNA);

a first switching device coupled between the second antenna port and the second LNA;

a second switching device coupled between the second antenna port and the second band filter; and a third switching device including a first terminal coupled to an input of the second LNA, a second terminal coupled to the first switching device, and a third terminal selectively coupled to the second band filter.

2. The apparatus of claim 1, further comprising a control circuit configured to close the first switching device based on a first receive carrier aggregation mode.

3. The apparatus of claim 2, wherein based on the first receive carrier aggregation mode:

the first set of one or more band filters is configured to filter a first set of one or more radio frequency (RF) signals received via the first antenna port, respectively;

the first set of one or more LNAs is configured to amplify the first set of one or more filtered RF signals, respectively; and the second LNA is configured to amplify a second radio frequency (RF) signal received via the second antenna port and the first switching device.

4. The apparatus of claim 2, further comprising a power amplifier (PA), wherein the second band filter is coupled between the PA and the second switching device.

5. The apparatus of claim 4, wherein the control circuit is configured to close the second switching device based on a second receive carrier aggregation mode.

6. The apparatus of claim 5, wherein based on the second receive carrier aggregation mode:

the first set of one or more band filters is configured to filter the first set of one or more RF signals received via the first antenna port, respectively;

the first set of one or more LNAs is configured to amplify the first set of one or more filtered RF signals, respectively; and the second band filter is configured to filter a third radio frequency (RF) signal generated by the PA for transmission via the second antenna port.

7. The apparatus of claim 6, further comprising:

a fourth switching device including a first terminal coupled to the second band filter, a second terminal coupled to the third terminal of the third switching device, and a third terminal coupled to an output of the PA;

wherein the control circuit is configured to:

couple the first terminal of the third switching device to the second terminal of the third switching device based on the first receive carrier aggregation mode; and couple the first terminal of the fourth switching device to the third terminal of the fourth switching device based on the second receive carrier aggregation mode.

8. The apparatus of claim 1, further comprising:

a first antenna coupled to the first antenna port; and a second antenna coupled to the second antenna port.

9. The apparatus of claim 1, further comprising a set of one or more switching devices coupled between the first antenna port and the first set of one or more band filters, respectively.

10. The apparatus of claim 1, further comprising one or more frequency downconverting stages coupled to the first set of one or more LNAs and the second LNA.

11. The apparatus of claim 1, further comprising a power amplifier (PA) coupled to the first set of one or more band filters.

12. The apparatus of claim 1, further comprising:

a power amplifier (PA); and a second set of one or more band filters coupled between the PA and the first antenna port.

13. The apparatus of claim 1, wherein the second band filter is coupled between the second switching device and the second LNA.

14. The apparatus of claim 13, further comprising a control circuit configured to open the second switching device and close the first switching device so that a radio frequency (RF) signal received via the second antenna port is provided to the second LNA while bypassing the second band filter.

15. The apparatus of claim 1, further comprising:

a third band filter;

a third low noise amplifier (LNA);

a fourth switching device coupled between the first antenna port and the third LNA; and a fifth switching device coupled between the first antenna port and the third band filter.

16. The apparatus of claim 1, further comprising:

a power amplifier (PA);

a third band filter;

a fourth band filter;

a fourth switching device coupled between the PA and the second, third, and fourth band filters, respectively;

a fifth switching device coupled between the third band filter and the second antenna port; and a sixth switching device coupled between the fourth band filter and the second antenna port.

17. A method, comprising:

receiving a first set of one or more radio frequency (RF) signals via a first antenna port in accordance with a first or second carrier aggregation mode;

filtering the first set of one or more RF signals in accordance with the first or second carrier aggregation mode;

amplifying the first set of one or more filtered RF signals in accordance with the first or second carrier aggregation mode;

receiving a second RF signal via a second antenna port in accordance with the first carrier aggregation mode;

bypassing, via a switching device, a filtering of the second RF signal in accordance with the first carrier aggregation mode; and amplifying, via a low noise amplifier (LNA) the filter-bypassed second RF signal in accordance with the first carrier aggregation mode; and wherein the switching device includes a first terminal coupled to an input of the LNA, a second terminal selectively coupled to the second antenna port, and a third terminal selectively coupled to a band filter configured to filter an RF signal communicated via the second antenna port.

18. The method of claim 17, further comprising:

generating a third RF signal in accordance with the second carrier aggregation mode;

filtering the third RF signal in accordance with the second carrier aggregation mode; and providing the filtered third RF signal to the second antenna port in accordance with the second carrier aggregation mode.

19. An apparatus, comprising:

means for receiving a first set of one or more radio frequency (RF) signals via a first antenna port in accordance with a first or second carrier aggregation mode;

means for filtering the first set of one or more RF signals in accordance with the first or second carrier aggregation mode;

means for amplifying the first set of one or more filtered RF signals in accordance with the first or second carrier aggregation mode;

means for receiving a second RF signal via a second antenna port in accordance with the first carrier aggregation mode;

means for bypassing a filtering of the second RF signal in accordance with the first carrier aggregation mode; and means for amplifying the filter-bypassed second RF signal in accordance with the first carrier aggregation mode;

wherein the means for bypassing includes a first terminal coupled to an input of the means for amplifying the filter-bypassed second RF signal, a second terminal selectively coupled to the second antenna port, and a third terminal selectively coupled to a means for filtering an RF signal communicated via the second antenna port.

20. The apparatus of aspect 19, further comprising: means for generating a third RF signal in accordance with the second carrier aggregation mode; means for filtering the third RF signal in accordance with the second carrier aggregation mode; and means for providing the filtered third RF signal to the second antenna port in accordance with the second carrier aggregation mode.

* * * * *